Oct. 29, 1957   T. M. DAHM ET AL   2,811,691
FILM RESISTANCE MEASURING DEVICE
Filed Jan. 7, 1954   3 Sheets-Sheet 1
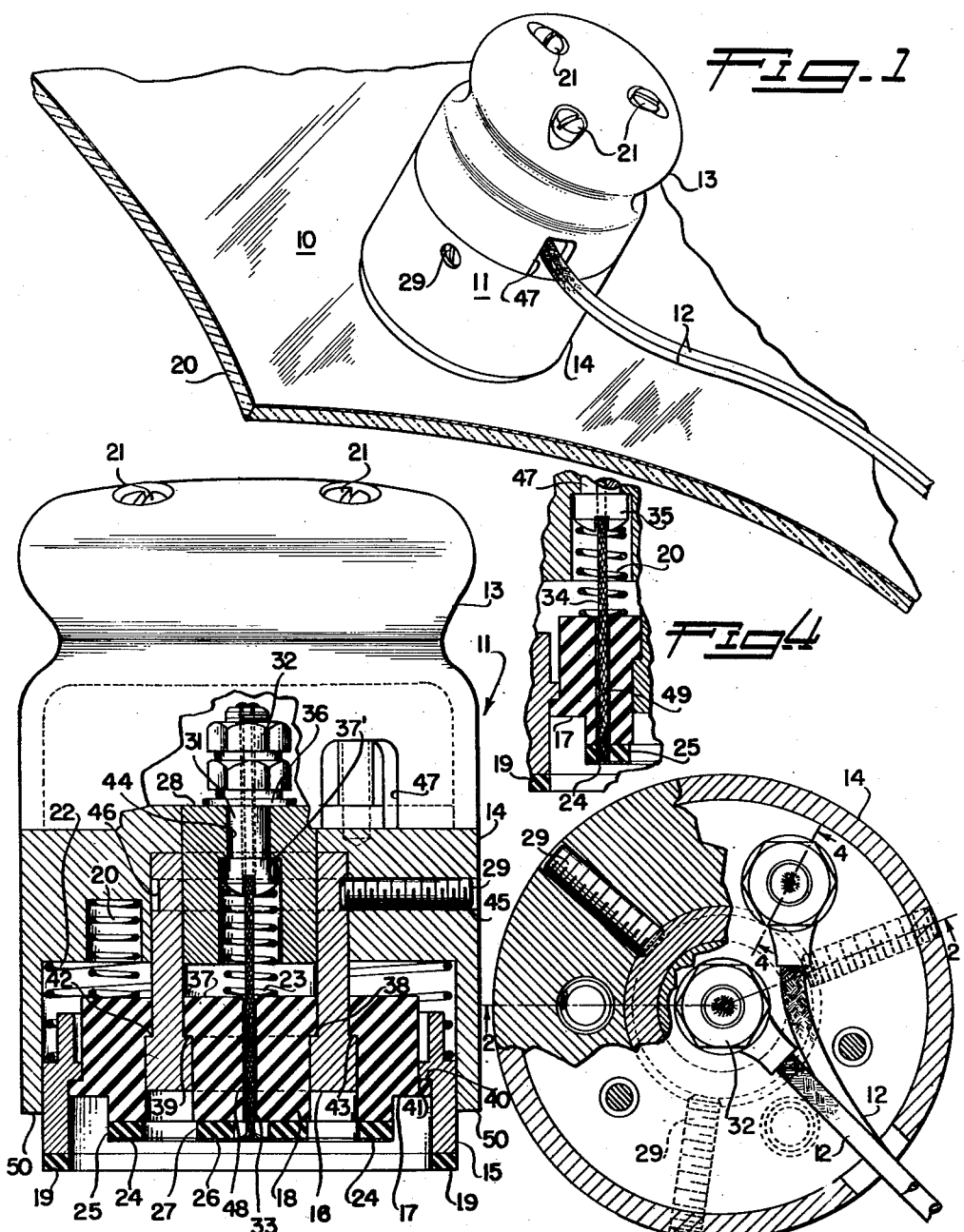
INVENTORS
THOMAS M. DAHM
RAYMOND A. HOLLOWAY
By *George C. Sullivan*
Agent

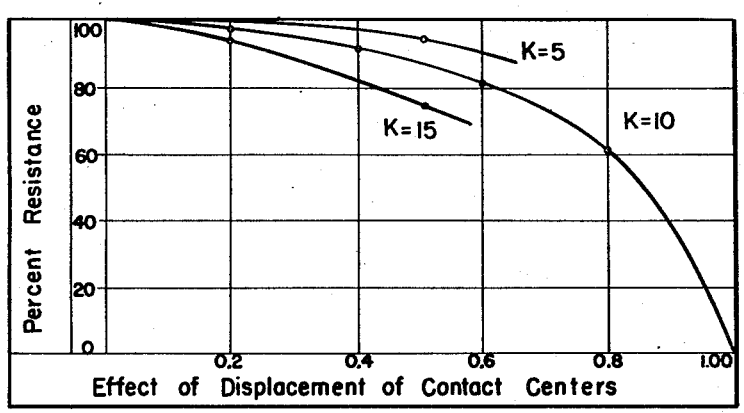
Fig. 5 — Effect of Displacement of Contact Centers
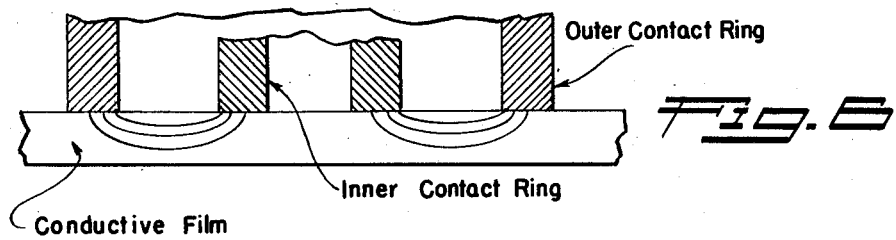
Fig. 6
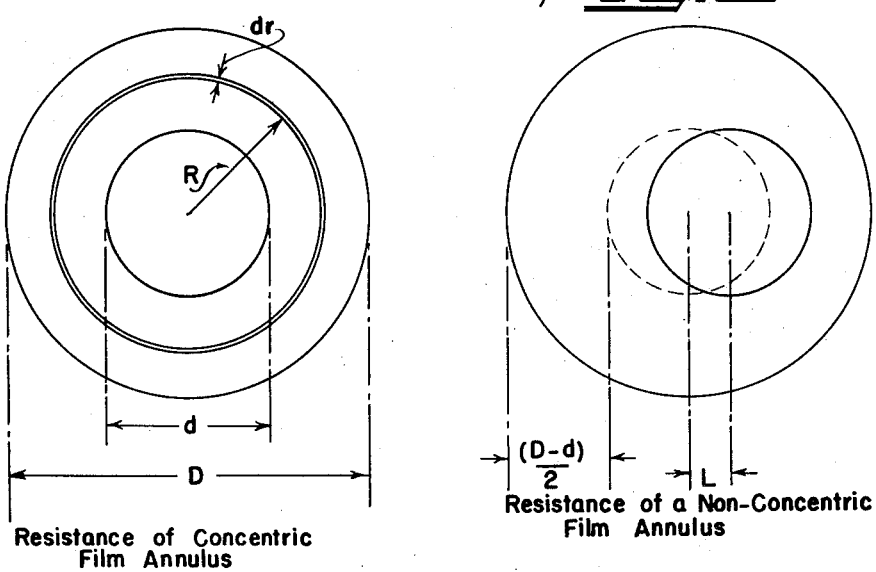
Fig. 7 — Resistance of Concentric Film Annulus
Fig. 8 — Resistance of a Non-Concentric Film Annulus
INVENTORS
THOMAS M. DAHM
RAYMOND A. HOLLOWAY
By George C. Sullivan
Agent Oct. 29, 1957 T. M. DAHM ET AL 2,811,691
FILM RESISTANCE MEASURING DEVICE
Filed Jan. 7, 1954 3 Sheets-Sheet 3
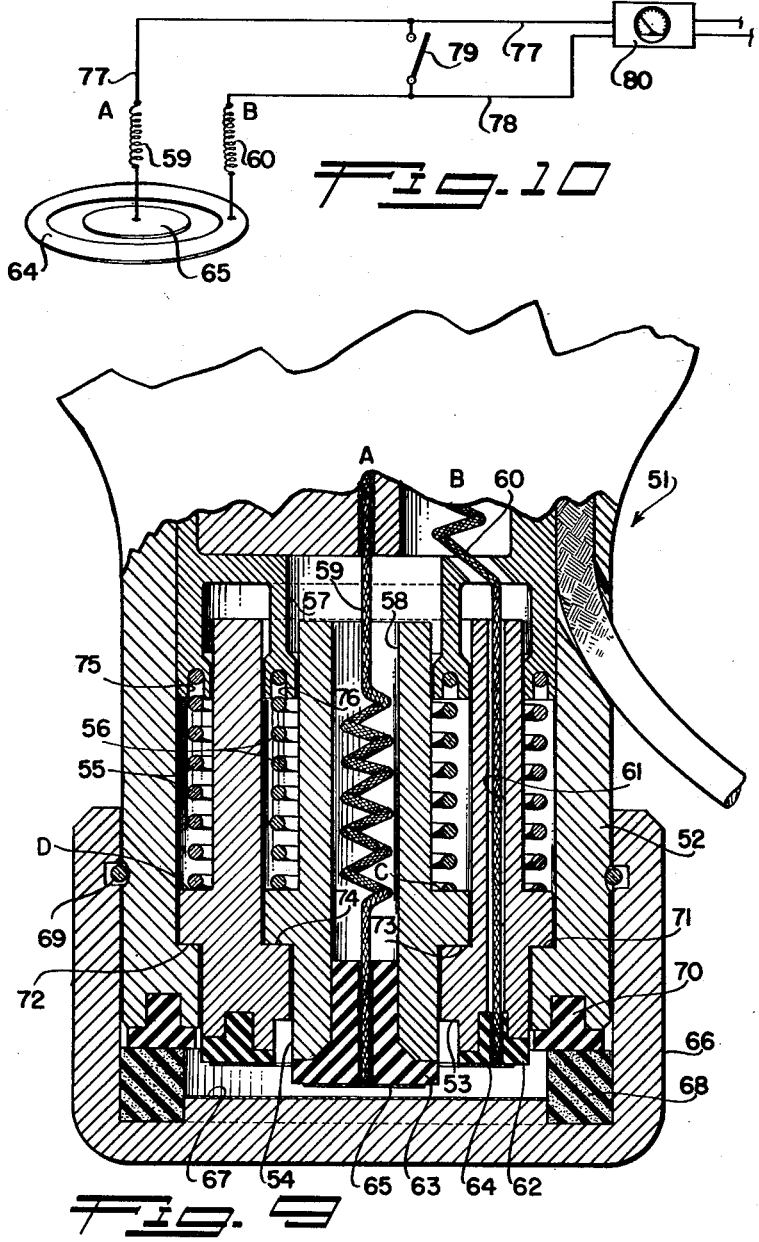
INVENTORS
THOMAS M. DAHM
RAYMOND A. HOLLOWAY
By George C. Sullivan
Agent United States Patent Office 2,811,691
Patented Oct. 29, 1957

2,811,691

FILM RESISTANCE MEASURING DEVICE

Thomas M. Dahm, Pasadena, and Raymond A. Holloway, North Hollywood, Calif., assignors to Lockheed Aircraft Corporation, Burbank, Calif.

Application January 7, 1954, Serial No. 402,652

12 Claims. (Cl. 324—65)

This invention relates to an apparatus and a method for measuring the electrical resistance to lateral flow in thin conductive sheets.

Thin conductive film coatings for heating purposes, de-icing, and anti-static applications are being used extensively in the manufacture of aircraft.

Laminated window glass with a thin electrically conducting transparent film coating is being used for de-icing of windows and pilots' windshields in modern aircraft. In order to raise the temperature of the windshield so as to melt or free the windshield or window from its coating of ice, a suitable amount of current must be run through the conductive film coating. As the heat developed by the thin coating is directly dependent on the resistivity of the said coating, some means must be developed to measure the resistivity of the film coating after it has been applied.

Another important application of thin film conductors is to provide a coating for bleeding static electricity from the surfaces of non-conductive materials. A few possible points of application of a thin conductive coating would be canopies, radomes, windows and windshields. In the case of radomes the film coating should not be of too great a magnitude as to materially obstruct the passage of micro-wave energy. In the case of pilot's windshields the film coating should not be of so great a magnitude as to materially affect the transparency of the said windshield.

The resistivity of a thin conducting film coating is easily determined if the film is uniform and if sampling is permitted. In sampling, rectangular areas are removed and bused on two sides. The resistance is measured and reduced to ohms per square, ohms per square being that value of resistance present in a square whose length and width are equal and is independent of the size of the square. Uniformity of the film coating is practically impossible of attainment and sampling of the film is a destructive act.

The foregoing uses of thin film conductors are only two of many possible applications and their use makes necessary an accurate and simple means of testing the resistivity and conductivity of thin film coatings.

In the search for a suitable procedure for testing thin film coatings, a method was considered which utilizes parallel current flow between straight buses segmented to form potential guards. However, the requirement for null measurements of main to guard bus potential makes this method awkward for field use.

Another method using spaced circular electrodes functions satisfactorily at the center of a large film area where the resistance is given by—

$$R \frac{\rho}{\pi t} \cosh^{-1}(D/d) \text{ ohms}$$

where resistivity

D   center to center spacing
d   electrode diameter
t   film thickness

The difficulty of correcting for edge effects is so great as to make the above method untenable.

It is an object of the present invention to provide a simple, practical and dependable method for measuring electrical resistance of thin film coatings.

Another object of the present invention is to provide a simple, practical and dependable method of determining the conductive of large masses.

Still another object of the present invention is to provide a simple, practical and dependable device or apparatus for measuring electrical resistance of thin film coatings.

A still further object of the present invention is to provide a simple, practical and dependable device or apparatus for measuring electrical resistance of thin film coverings which eliminates the necessity of sampling or other destructive measures.

Another object of the present invention is to provide a simple, practical and dependable method and apparatus that is accurate at the edges of the conductive film covering or sheet.

A still further object of the present invention is to provide a simple, practical and dependable device or apparatus not critically dependent upon the geometry of the probe used.

A still further object of the present invention is to provide an apparatus or device to eliminate the necessity of making corrections for edge effects in measuring the resistance of thin film coatings of large irregular shaped areas.

Other objects of the present invention will become apparent from the following detailed preferred embodiment through which reference will be made to the accompanying drawings wherein:

Figure 1 is an isometric view of the device;
Figure 2 is a view of Figure 3 taken at line 2—2;
Figure 3 is a cross sectional view of the device;
Figure 4 is a view of Figure 3 taken at line 4—4;
Figure 5 is a graphical representation of percent resistance to misplacement of probe contact centers;
Figure 6 is an exaggerated pictorial representation of current flow in a thin film conductor;
Figure 7 is a pictorial representation of the derivation of the mathematical equation of determining the resistance between concentric equipotential circles;
Figure 8 is a pictorial representation of the derivation of the mathematical equation used to determine the resistance of a non-concentric film annulus;
Figure 9 is a sectional view of a second embodiment of the device; and
Figure 10 is a wiring diagram represented schematically of one method of furnishing electrical potential to each of the devices.

In the following paragraphs a method and apparatus will be outlined which gives results comparable in accuracy to the sample method, yet in no way injures the film. It is unique in that the measuring current flows radially within a limited area unaffected by film geometry external to the device. The only other instrument required is a bridge or ohmmeter with adequate range. The necessary arrangement of electrodes which produce the radial flow will be referred to as a probe.

The probe 11, Figure 1, is shown as it could be utilized in one of its typical applications of measuring the resistance of a thin film coating 10. The wires 12 are connected to any suitable electrical supply source and resistance indicating device.

In Figure 2, the cover 13 of the probe 11 is attached to a housing 14 by means of three cover mounting screws 21. The housing 14 and the inner guide ring 16 are firmly joined by means of three housings to inner ring attaching screws 29. The plug 28 is cemented in the housing 14. The said plug 28 has a hole through its longitudinal axis through which is inserted an inner electrode terminal screw 31. The said terminal screw 31 is secured to the plug 28 by means of inner electrode terminal screw nuts 32.

Positioned between the mounting face of the plug 28 and the inner electrode terminal screw nut 32 is a washer 36. Slidably mounted in the open end of the inner guide ring 16 opposite the location of the plug 28 is the inner electrode 18. The inner electrode 18 is held in position by an inner electrode spring 23. The said inner electrode spring 23 is normally relaxed and extends from the inner face 37 of the inner electrode 18 to the head 37' of the inner electrode terminal screw 31. The inner electrode 18 is prevented from becoming disengaged from the inner guide ring 16, within which it is slidably mounted, as heretofore mentioned, by means of an offset 38 in the inner electrode 18 and a matching offset 39 in the inner guide ring 16.

Mounted flush against the inner face of the housing 14 is the stop ring 15. The stop ring 15 is also slidably mounted within the housing 14 and is positioned by means of a stop ring spring 22. The said stop ring 15 is prevented from becoming free of the housing 14 by means of two engaging offsets 40 and 41, offset 40 being a part of the stop ring 15, and offset 41 being a part of the outer electrode 17.

Mounted on the face of the stop ring 15 is a cushion 19 of rubber or synthetic rubber, or the like. On the face of the outer electrode 17 is mounted an outer electrode cushion 25, which may be of any suitable material. Mounted on the outer electrode cushion 25 is an outer electrode contact 24. The inner electrode 18 has also mounted on its face an inner electrode cushion 27 which also may be of any suitable material. As a part of the inner electrode 18 an inner electrode contact 26 is mounted on the inner electrode cushion 27.

Still referring to Figure 2, an inner electrode conductor 33 is shown connecting the inner electrode terminal screw 37 to the inner electrode contact 26.

In Figure 4 an outer electrode conductor 34 is shown connecting the outer electrode terminal screw 35 to the outer electrode contact 24.

The outer electrode 17 is in slidable position so as to coact with both the stop ring 15 and the inner guide ring 16. The said outer electrode 17 is maintained in its non-operating position by means of an outer electrode spring 20. Two interacting offsets 42 and 43 hold the outer electrode 17 in the probe 11 assembly, offset 42 being in the outer electrode 17 and offset 43 being a part of the inner guide ring 16.

The inner electrode 18 is also maintained in place by an inner electrode spring 23 and an offset 38 in the said inner electrode 18. The inner electrode 18 offset 38 coacts with an offset 39 which is a part of the inner guide ring 16. The inner guide ring 16 is held in place by three housings to inner ring attaching screws 29.

In Figure 9 a different embodiment of the present invention is shown.

The housing 52 of the probe 51 contains an outer electrode 53 which is held in position within the said housing 52 by an offset 71 in the said outer electrode 53 which mates with an offset 72 in the housing 52.

The outer electrode 53 is held in position against the offset 72 by the action of the outer electrode spring 55. A hole 61 is run longitudinally through the outer electrode 53 through which is inserted an outer electrode conductor 60. One end of the said outer electrode conductor 60 is attached to an outer electrode contact 64 while the remaining end of the said outer electrode conductor 60 is secured to an intermediate tie point B.

The outer electrode contact 64 is mounted on an outer electrode cushion 62 which is positioned between the outer electrode 53 and the outer electrode contact 64. The said outer electrode cushion 62 is secured to the outer electrode 53.

The said outer electrode 53 is slidably mounted within the said housing 52 and the sliding movement is restrained and controlled by the heretofore mentioned offsets 71 and 72. An outer electrode spring 55 provides the required urging force to the outer electrode.

Positioned within the outer electrode 53 is an inner electrode 54. The inner electrode 54 is slidably mounted within the said outer electrode 53 and the sliding movement is controlled and limited by the offsets 73 and 74, offset 73 being a part of the outer electrode 53 and offset 74 a part of the inner electrode 54. An inner electrode spring 56 is placed about the inner electrode 54 which provides the required urging force to the said inner electrode 54.

A hole 58 runs longitudinally throlugh the inner electrode 54 in which the inner electrode conductor 59 is inserted. On end of the inner electrode conductor 59 is secured to an inner electrode contact surface 65 while the remaining end of the said inner electrode conductor 59 is attached to an intermediate tie point A.

The inner electrode contact surface 65 is secured to an inner electrode cushion 63, said inner electrode cushion 63 being positioned between the said contact surface 65 and the inner electrode 54. The said inner electrode cushion 63 is secured to the inner electrode 54.

Still referring to Figure 9, there is shown a removable protective covering 66 which is held in position about and over the contact bearing surfaces 64 and 65 of the probe 51 by a protective covering locking ring 69. Within the confines of the said removable protective covering 66 is a metallic conductive sheet 67.

The metallic conductive sheet 67 is utilized to check the operation of the probe 51. The contact surfaces 64 and 65 of the outer 53 and inner 54 electrodes may be made to bear against the said metallic conductive sheet 67 which will give an indication on the resistance indicating device 80, Figure 10, of the passage of an electric current through the inner and outer electrode contact surfaces 64 and 65.

As a part of the said removable protective covering 66 is a probe cover cushion 68 on which a probe cushion 70 rests when the said removable protective covering 66 is in place.

The outer electrode spring 55 and the inner electrode spring 56, heretofore mentioned, are both shown in their non-operating position. Both springs, the inner electrode spring 56 and the outer electrode spring 55 are urged against the inner electrode 54 and the outer electrode 53 by a spring retaining ring 57. The said spring retaining ring 57 has two channels 75 and 76 which engage the first turns of the outer and inner electrode springs 55 and 56 whereby the force of the two springs 55 and 56 is applied to the inner electrode 54 at C and to the outer electrode 53 at D.

In Figure 10, a conductor 77 is shown terminating at point A and a similar conductor 78 terminating at point B. Said points A and B are the intermediate tie points heretofore mentioned.

The conductors 77 and 78 are the means of furnishing the necessary electrical potential from an external power source (not shown) to the inner electrode contact 65 and the outer electrode contact 64 through the inner electrode conductor 59 and the outer electrode conductor 60. Said points A and B are common tie points for the conductors 77 and 78 and the outer and inner electrode conductors 60 and 59.

A switch 79, in Figure 10, is shown positioned across the conductor 77 and 78 which is used to remove the inner electrode 54 and the outer electrode 53 from the circuit. The switch 79 may be of any suitable type and may be located in the probe 51 or positioned at some remote location.

Figure 10 also shows a resistance indicating device 80 which may be of any suitable type, range and value in order to give an indication of the resistance of the material, film, or sheets being tested.

The typical circuit arrangement, Figure 10, and indicating device 80 shown therein, is depicted and described as it would be used with the probe 51. It is readily seen, however, that such circuitry may be used with the probe 11 and such is the intention.

The probe 11, in the present embodiment, is assembled in the following manner:

The inner electrode terminal screw 31, to which the inner electrode conductor 33 has been previously attached, is inserted in the hole 44, said hole 44 running longitudinally of the plug 28. The inner electrode terminal screw 31 is securely fastened to the said plug 28 by means of two inner electrode terminal screw nuts 32 and a washer 36. The next assembly operation is the insertion of the outer electrode 17 within the stop ring 15 until the offsets 40 and 41 abut or meet. The inner electrode 18 is now inserted into the larger opening of the inner guide ring 16 until the offsets 38 and 39 meet. The inner guide ring 16, with the inner electrode 18 inserted therein, is now positioned within the outer electrode 17 until the offsets 42 and 43 become engaged. The plug 28 is next inserted in the housing 14 and secured in place. At this point of the assembly of the probe 11 the stop ring 15, the outer electrode 17, the inner guide ring 16, and the inner electrode 18 are fitted together in their various coacting relationships.

The stop ring spring 22 and the outer and inner electrode springs 20 and 23 respectively are placed in the positions provided for them in the housing 14 and plug 28. The stop ring 15, the outer electrode 17, the inner guide ring 16 and the inner electrode 18, which have been previously assembled as heretofore described, are now positioned in the housing 14. The conductors 33 and 34 are run through the openings 48 and 49 provided for them in the inner electrode 18 and the outer electrode 17. The above mentioned assembly is now secured in place within the housing 14 by inserting the housing to inner ring attaching screws 29 in the threaded openings 45 in the housing 14 until the advancing ends of the said screws 29 become engaged with the inner guide ring 16, said engagement being made positive by a circumferential depression 46 about the inner guide ring 16.

The unattached or free ends of the conductors 33 and 34 are now secured to the inner electrode contact 26 and the outer electrode contact 24 respectively. The conductors 12 are connected to the inner conductor terminal screw 31 and to the outer conductor terminal screw 47. The probe 11 is now assembled with the exception of the cover which is next mounted on the housing 14. The said cover 13 has an opening 47 through which the conductors 12 are run. The cover 13 is secured to the housing 14 by means of three cover mounting screws 21.

The various parts from which the probe 11 is assembled are made, in the present embodiment, from brass and phenolic resin. The housing 14, the stop ring 15, the inner guide ring 16, the plug 28, and the cover 13 are formed from phenolic resin. The outer electrode 17 and the inner electrode 18 are made from brass.

Nothing in the foregoing description, however, is intended to be construed as a limitation as to what materials may be used. It is imperative that there be a negligible small passage of current between the outer electrode contact 24 and the inner electrode contact 26 except when the probe 11 is being used for its design purpose.

The mechanical operation of the probe 11 is dependent upon and controlled by the stop ring spring 22, the outer electrode spring 20, and the inner electrode spring 23, along with the coacting relationship of the various bearing surfaces and offsets as heretofore described.

The probe 11 is placed upon the material whose resistivity is to be determined. The cushions 19 of the stop ring 15 being the part of the probe 11 that makes the initial contact and, accordingly, supports the probe 11 during the following sequential mechanical operations. Hand pressure is applied to the cover 13 which causes the housing 14 to which the said cover 13 is attached to move toward the surface of the material on which the probe 11 is resting. As the housing 14 descends the stop ring spring 22 is placed under compression, which causes the stop ring 15 to press firmly against the material under investigation. At the same time the inner electrode spring 23 and the outer electrode spring 20 are also being placed under compression. The compressive action of the said springs 20 and 23 is borne by the outer electrode 17 and the inner electrode 18 respectively. At this time there is no independent movement of either of the said electrodes 17 and 18 as their movement is restrained by the interlocking offsets 38 and 39, and 42 and 43. The offsets 43 and 39 being a part of the inner guide ring 16 which is securely fastened in place by the three housings to inner ring attaching screws 29. The offset 38 being a part of the inner electrode 18, and the offset 42 being a part of the outer electrode 17. The inner electrode 18 and the outer electrode 17 do descend, however, along with the housing 14 until the outer electrode contact 24 and the inner electrode contact 26 bear against the film being tested. At this stage in the operation of the probe 11, the electrode contacts 24 and 26 have reached the limits of their travel and now rest on the surfaces of the film being tested as does the cushion 19 of the stop ring 15, as has been previously described.

The cushions, 25 and 27, have a function in addition to being the supporting means for the contact surfaces 24 and 26. In instances where resistance measurements are made on irregular or curved thin film surfaces 10, the soft, yielding, resilient cushions 25 and 27 will be compressed, under suitable hand pressure applied to the cover 13, to cause the cushions 25 and 27 to compensate for the irregularities of the coated surface. This compression action of the cushions 25 and 27 will allow the contact surfaces 24 and 27 to bear uniformly on the irregular or curved film surface 10.

There remains an additional travel distance the housing 14 may utilize before it also presses or bears against the stop ring 15. The probe 11 is now position to be used as the means of measuring resistance in a thin film coating 10 and a resistance measurement can now be read from the resistance indicating device that may be used in this particular utilization of the probe 11. The above design features assure control of the electrode contact pressure at the desired level.

As the hand pressure is lessened the stop ring spring 22 will assume its normal position which will allow the housing 14 and the stop ring 15 to return to their original positions. The outer electrode 17 and the inner electrode 18 will also return to their non-bearing position by the action of the outer electrode spring 20 and the inner electrode spring 23 which also will reassume their original positions.

In the above description of the operation of the probe 11, mention has been made of springs and of travel distance of the various moving parts of the probe 11. However, nothing in this description is intended to limit the design of the present invention as to the amount of travel distance of the parts, or of the sequential action of the parts described as caused by the relative action of the various springs mentioned. In view of the detailed description of the operation of the probe 11, it is felt that a further detailed description of the assembly and operation of the probe 51 would be repetitious as it is readily apparent that the operation of both embodiments of the probes 11 and 51 is similar.

The theory of operation of the present invention being that current will flow radially in any annulus of conducting material formed by the inner circular edge of an outer bus and the concentric circular outer edge of an inner bus 17 and 18, 53 and 54, which are maintained at differential potential. The current density will be circumferentially uniform if the resistance of the film 10 is uniform.

Such a current flow pattern is unaltered in thin film by replacing the buses with circular electrodes 17, 18, 53 and 54 having pressure contacts 24, 26, 64 and 65, providing that the resistance of the latter is either uniform or negligible in comparison to that of the annulus.

Details and precision of electrode construction may differ according to the type of film to be measured. Solid brass electrodes, plain or silver plated, are satisfactory for conductive rubber measurements. The electrodes 17, 18, 53 and 54 may be fixed and coplanar if flat backing can be used when measurements are made on rubber. For unyielding film coatings such as tin oxide coatings on glass, the contacts 24, 26, 64 and 65 should be of silver or platinum foil backed up by a cushion of soft rubber, synthetic rubber, or the like, 25, 26, 62 and 63 to maintain contact at the annulus boundaries. For curved films, independent axial motion of the electrodes 17, 18, 53 and 54 is required and because contact resistance varies with pressure, control of the latter is desirable.

Resistance of an annulus to radial current flow is derived in principle in connection with insulation resistance of metal sheathed round wire. The resistance of an annulus of infinitesimal width $dr$, Figure 7, and thickness $t$ is:

$$dR = \rho dr / (2\pi rt)$$

where $r$ is the radius of the annulus. The total resistance $R$ between concentric equipotential circles of diameter $d$ and $D$ is by integration;

$$R = \int_{d/2}^{D/2} dR = \int_{d/2}^{D/2} \frac{\rho dr}{2\pi rt} = \frac{\rho}{2\pi t} \log_e r \Big]_{d/2}^{D/2}$$

so that:

$$R = \frac{\rho \times \log_e (D/d)}{2\pi t}$$

in ohms where $D$ and $d$ are the outer and inner annulus diameters. From this relation, the surface resistivity $\rho_s$ equal to $\rho/t$ where $t$ is the film thickness is $$\rho_s = 2\pi R / \log_e (D/d)$$

or $$\rho_s = 2.729 / \log_{10}(D/d)$$

in ohms per square.

It is not possible to measure directly in ohms per square with reasonable accuracy since this requires an excessive value of $D/d$. A gage factor K may be chosen such that the resistance per square is K times the value measured by the probe, then $$\rho_s = K \cdot R = \frac{1}{2\pi} K \rho_s \log_e (D/d)$$

ohms per square.
Hence:

$$K = 2\pi / \log_e (D/d)$$

Ratios of $D/d$ as calculated from the above equation corresponding to certain integer values of K are listed in the following table.

| K | D/d | K | D/d |
|---|---|---|---|
| 1 | 535.5 | 10 | 1.874 |
| 5 | 3.514 | 11 | 1.770 |
| 6 | 2.850 | 12 | 1.688 |
| 7 | 2.454 | 13 | 1.621 |
| 8 | 2.193 | 14 | 1.566 |
| 9 | 2.010 | 15 | 1.524 |

However carefully the probes 11 and 51 may be constructed, significant sources of error are present: 1, lack of central symmetry, and 2, poor annulus edge definition.

Since the electrodes 17, 18, 53 and 54 are never perfectly concentric, the magnitude of the error from this cause must be ascertained.

In the equations Q CV and I gE the quantities charge Q, potential difference V, and capacitance C in electrostatic fields are analogous respectively to the quantities current I, electromotive force E, and conductance $g$(equal to $1/R$) in a current flow pattern between two buses separated by a conductive medium.

Specifically, the capacitance per unit length between two long cylindrical conductors in an insulating medium is related to the resistance in a conducting medium between two cylindrical buses, when the geometry is identical, by:

$$4\pi C \cong g\rho$$

where C is in electrostatic c. g. s. units and where $\rho$ the resistivity and $g$ must be in one system of units.

The ratio of the capacitance $C_e$ of an eccentric cylindrical condenser with axes displaced a distance C, Figure 8, to that of a concentric condenser $C_c$ is $$\frac{C_e}{C_c} = \frac{\cosh^{-1}(b^2 + a^2)/2ba}{\cosh^{-1}(b^2 + a^2 - L^2)/2ba}$$

where $a$ and $b$ are the radii of the inner and outer cylinders. By analogy, the ratio of the conductance $g_c$ of a concentric annulus with the diameters D and d to the conductance $g_n$ of a surface bounded by circles of diameters D and d but with centers displaced is:

$$\frac{g_e}{g_c} = \frac{R_c}{R_e} \frac{\cosh^{-1} \frac{D^2 + d^2 - k^2(D-d)^2}{2Dd}}{\cosh^{-1} \frac{D^2 + d^2}{2Dd}}$$

where $$k = \frac{L}{(D-d)/2}$$

is the ratio of actual displacement of centers L to the width of the concentric anulus from inner to outer edge.

Measurement errors determined by means of the above equation are plotted in Figure 2 for typical values of the gage factor K. For example, when K is ten, $k$ will rarely exceed one-tenth and the error from this cause is less than one percent.

When measuring conductive rubber sheeting, the annulus edges will be poorly defined. Figure 6 suggests the pattern of current flow when the film thickness is exaggerated for purposes of illustration. The errors from this cause cannot in general be evaluated because of the interaction of the effects of contact resistance and film thickness. It is obvious, however, that electrode diameters large compared to film thickness and cleanliness of the film and contacts will improve the accuracy of the measurements. Overall errors also depend on meter precision and are from three percent with a good bridge on thin films to perhaps twenty percent with an ohmmeter on conductive rubber.

There are certain precautions which must be taken into consideration when using the probes 11 and 15 as above described. Measuring currents must be limited to values which will convert to heat less than one-tenth watt per square inch. Temperatures produced by greater values of power loss may cause errors due to local changes of resistivity or may conceivably damage the film coating 10. The film heating during measurement is proportional to the square of the current density which is greater near the inner electrode contacts 26 and 65. The ratio of the maximum heating to the average value can be proven to be nearly $$\frac{K}{4}\left(e^{\frac{4\pi}{K}} - 1\right)$$

From this analysis it is seen that bridge currents may overheat thin film if K is too small (in practice, about 5).

Having described only typical forms of the invention we do not wish to be limited to the specific details herein

We claim:

1. A device of the character described comprising a housing, an inner electrode presenting a circular outer periphery, an outer electrode having a circular inner periphery, said peripheries of the electrodes being concentric and in spaced relationship to each other, means carried by the housing to guide the electrodes for relative axial movement within the said housing, an outer electrode spring acting upon the said outer electrodes, and an inner electrode spring acting upon the said inner electrode, said springs yieldingly resisting the movement of the electrodes in one direction from positions where said peripheries are exposed at the exterior of the housing, said means guiding said electrodes adjacent said exterior of the housing to maintain said peripheries in concentric relation.

2. A device of the character described comprising a housing, a circular inner electrode, an annular outer electrode, said electrodes being concentric and in spaced relationship to each other, said electrodes having relative axial movement within the said housing, an outer electrode spring acting upon the said outer electrode, an inner electrode spring acting upon the said inner electrode, said springs yieldingly resisting the movement of the electrodes in one direction from positions where they are exposed at the exterior of the housing, means carried by the housing and engaging the electrodes adjacent the exterior of the housing to slidably guide the electrodes for such movement and to maintain the concentric relationship of the electrodes, and a resistance measuring circuit including conductors connected with the said electrodes.

3. A device of the character described comprising a housing, a circular inner electrode, an annular outer electrode, said electrodes being concentric and in spaced relationship to each other, said electrodes having relative axial movement within the said housing, a spring acting upon the said outer electrode, a spring acting upon the said inner electrode, said springs yieldingly resisting the movement of the electrodes in one direction from positions where they are exposed at the exterior of the housing, means carried by the housing and engaging the electrodes adjacent the exterior of the housing to slidably guide the electrodes for such movement and to maintain the concentric relationship of the electrodes, a cushion on the inner electrode, a cushion on the outer electrode, an inner electrode contact surface on the inner electrode cushion, an outer electrode contact surface on the outer electrode cushion, said contact surfaces being spaced away from the electrodes by the said electrode cushions.

4. A device of the character described comprising a housing, a circular inner electrode, an annular outer electrode, said electrodes being concentric and in spaced relationship to each other, said electrodes having relative axial movement within the said housing, a spring acting upon the said outer electrode, a spring acting upon the said inner electrode, said springs yieldingly resisting the movement of the electrodes in one direction from positions where they are exposed at the exterior of the housing, means carried by the housing and engaging the electrodes adjacent the exterior of the housing to slidably guide the electrodes for such movement and to maintain the concentric relationship of the electrodes, a cushion on the inner electrode, a cushion on the outer electrode, an inner electrode contact surface on the inner electrode cushion, an outer electrode contact surface on the outer electrode cushion, said contact surfaces being spaced away from the electrodes by the said electrode cushions, and a resistance measuring circuit including conductors connected with the contact surfaces.

5. A device for measuring the electrical resistance of a body comprising a pair of independently axially movable annular electrodes arranged in spaced concentric relation, the electrodes presenting surfaces for engaging said body, a housing for the electrodes, spring means yieldingly urging the electrodes to positions where they protrude from the housing so that said surfaces are exposed to be engaged on said body, a resistance measuring circuit including conductors connected with the electrodes, said electrodes being constructed and arranged so that their said surfaces have spaced circular concentric edges to contact said body and to define between them an annulus of the body for the radial flow of current therein from one of said edges to the other, and means on the housing slidably guiding the electrodes adjacent the region where they protrude from the housing to preserve the concentricity of said edges.

6. A device of the character described comprising a housing, a stop ring guided for axial movement by the said housing, an inner guide ring within the said housing, outer and inner electrodes guided for axial movement by the said inner guide ring, said electrodes being concentric and substantially annular in form and in spaced relationship to each other, an outer electrode spring, an inner electrode spring, a stop ring spring, said springs yieldingly resisting the movement of the said electrodes and stop ring in one direction from positions at the exterior of the housing.

7. In a device of the character described, a housing, a stop ring guided for axial movement by the said housing, an outer electrode whose movement is limited by the said stop ring, said stop ring and outer electrode being concentric and substantially annular in form, a spring acting upon the said stop ring, a spring acting upon the said outer electrode, said springs yieldingly resisting the movement of the electrodes and stop ring in one direction from positions at the exterior of the housing, said stop ring including a resilient dielectric cushion, said outer electrode including a resilient dielectric cushion and a conductive material contact carried on the second named cushion.

8. In a device of the character described, a housing having attaching means for a circuit external of the said device, a stop ring guided for axial movement in the said housing, a guide ring within the said housing, an outer electrode guided for axial movement by the said guide ring and limited in movement by the stop ring, said electrode and rings being concentric and substantially annular in form, a spring acting upon the said outer electrode, a spring acting upon the said stop ring, said springs yieldingly resisting the movement of the said stop ring and electrode in one direction from a position at the exterior of the housing, said outer electrode including a resilient dielectric cushion and a conductive material contact carried on the said cushion, said stop ring including a resilient cushion, an electrical conductor joining the said electrical circuit attaching means to the contact surface of the said outer conductor.

9. A device of the character described comprising a housing, a stop ring guided for axial movement by the said housing, a guide means within the housing, an outer electrode, an inner electrode, said electrodes being concentric and substantially annular in form and in spaced relationship to each other, said electrodes guided for relative axial movement by the guide means, said outer electrode being limited in axial movement by the said stop ring, a stop ring spring, an outer electrode spring, said springs yieldingly resisting the movement of their respective electrodes and stop ring in one direction from positions at the exterior of the housing, said outer electrode including a resilient dielectric cushion, said inner electrode including a resilient dielectric cushion and a conductive material carried on said electrode cushion, said stop ring including a resilient cushion, and a resistance measuring circuit including conductors connected with the electrode conductive material.

10. A device of the character described comprising a housing, an outer electrode guided for axial movement by the said housing, an inner electrode guided for axial movement by the said outer electrode, said electrodes being concentric and substantially annular in form and in spaced relationship to each other and adapted to protrude from the exterior of the said housing, a spring acting upon the said outer electrode, a spring acting upon the said inner electrode, said springs yieldingly resisting the movement of the electrodes in one direction from positions where they protrude from the exterior of the said housing, said housing including a resilient dielectric cushion, said outer and inner electrodes each including a resilient dielectric cushion and a conductive material carried on the said cushion.

11. A device of the character described comprising a housing, an outer electrode guided for axial movement by the said housing, an inner electrode guided for axial movement by the said outer electrode, said electrodes being concentric and substantially annular in form and in spaced relationship to each other and adapted to protrude from the exterior of the said housing, a spring acting upon the said outer electrode, a spring acting upon the said inner electrode, said springs yieldingly resisting the movement of the electrodes in one direction from positions where they protrude from the exterior of the said housing, said housing including an external resilient dielectric cushion, said outer and inner electrodes including a resilient dielectric cushion; a conductive material carried on the said inner and outer electrode cushions, and a resistance measuring circuit including conductors connected with the electrode conductive material.

12. In a device of the character described, a housing, an annular inner electrode, an annular outer electrode, said electrodes being concentric and in spaced relationship to each other, means guiding the electrodes for relative axial movement within the housing and to protrude from the exterior of the said housing, a removable cover secured to the said housing to cover the exposed ends of the said electrodes, said cover comprising a conductive member to be engaged by the electrodes upon relative axial movement between the electrodes and cover.

References Cited in the file of this patent

UNITED STATES PATENTS

| | | |
|---|---|---|
| 2,532,929 | McBrayer | Dec. 5, 1950 |
| 2,586,868 | Scott | Feb. 26, 1952 |
| 2,663,844 | Earle et al. | Dec. 22, 1953 |
| 2,692,972 | Edgerton et al. | Oct. 26, 1954 |